US007999811B2

(12) United States Patent
Liu et al.

(10) Patent No.: US 7,999,811 B2
(45) Date of Patent: Aug. 16, 2011

(54) IMAGE PROCESSING DEVICE, METHOD, AND PROGRAM, AND OBJECTIVE FUNCTION

(75) Inventors: Yuyu Liu, Tokyo (JP); Weiguo Wu, Tokyo (JP); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 827 days.

(21) Appl. No.: 12/008,815

(22) Filed: Jan. 14, 2008

(65) Prior Publication Data

US 2008/0284784 A1    Nov. 20, 2008

(30) Foreign Application Priority Data

Jan. 16, 2007   (JP) ............................... P2007-006630
Aug. 1, 2007   (JP) ............................... P2007-200477

(51) Int. Cl.
*G06T 13/00*   (2011.01)
*G06T 15/00*   (2011.01)
*G06T 15/70*   (2006.01)
*G09G 5/00*   (2006.01)

(52) U.S. Cl. ......... 345/474; 345/419; 345/653; 345/679
(58) Field of Classification Search .......... 345/473–475; 703/2–6

See application file for complete search history.

(56) References Cited

U.S. PATENT DOCUMENTS

| | | | |
|---|---|---|---|
| 6,169,817 B1 * | 1/2001 | Parker et al. | 382/131 |
| 6,760,488 B1 * | 7/2004 | Moura et al. | 382/285 |
| 7,184,071 B2 * | 2/2007 | Chellappa et al. | 348/46 |

FOREIGN PATENT DOCUMENTS

| | | |
|---|---|---|
| JP | 2000 259204 | 9/2000 |
| JP | 2002 269580 | 9/2002 |

OTHER PUBLICATIONS

D. Demirdjian, Enforcing constraints for Human Body Tracking, Jun. 2003, IEEE Computer Vision and Pattern Recognition Workshop 2003, vol. 9, pp. 1-8.*
Paul J. Besl and Neil D. McKay, A Method for Registration of 3-D Shapes, Feb. 1992, IEEE Transactions on Pattern Analysis and Machine Intelligence, vol. 14, No. 2, pp. 239-256.*
Douglas Downing, "Trigonometry: The Easy Way", 2001, Barron's Educational Series, Inc.*
James D. Foley, Andries van Dam, Steven K. Feiner, and John F. Hughes, "Computer Graphics: Principles and Practice", Jul. 1997, Addison-Wesley, Second Edition.*
D. Demirdjian, T. Ko and T. Darrell. "Constraining Human Body Tracking". Proceedings of ICCV, vol. 2, pp. 1071, Oct. 2003.

(Continued)

*Primary Examiner* — Kee M Tung
*Assistant Examiner* — Sing-Wai Wu
(74) *Attorney, Agent, or Firm* — Frommer Lawrence & Haug LLP; William S. Frommer; Paul A. Levy (57) ABSTRACT

An image processing device that models, based on a plurality of frame images being results of time-sequential imaging of an object in motion, a motion of the object using a three-dimensional (3D) body configured by a plurality of parts is disclosed. The device includes: acquisition means for acquiring the frame images being the imaging results; estimation means for computing a first matrix of coordinates of a joint of the 3D body and a second matrix of coordinates of each of the parts of the 3D body, and generating a first motion vector; computing means for computing a second motion vector; and determination means for determining the 3D body.

9 Claims, 5 Drawing Sheets

OTHER PUBLICATIONS

Christoph Bregler, Jitendra Malik and Katherine Pullen. "Twist Based Acquisition and Tracking of Animal and Human Kinematics". IJCV, vol. 56, No. 3, pp. 179-194, Feb. 2004.

Steffen Knoop, Stefan Vacek, and Rudiger Dillmann. "Modeling Joint Constraints for an Articulated 3D Human Body Model with Artificial Correspondences in ICP". Proceedings of 2005 $5^{th}$ IEEE-RAS International Conference on Humanoid Robots, Dec. 2005.

Ivana Mikic, Mohan Trivedi, Edward Hunter and Pamela Cosman. "Human Body Model Acquisition and Tracking Using Voxel Data". IJCV, vol. 53, No. 3, pp. 199-223, Jul. 2003.

* cited by examiner

FIG. 1

FRAME IMAGE F0

A

FRAME IMAGE F1

B

3D BODY IMAGE B0

C

3D BODY IMAGE B1
BY MOTION VECTOR Δ
WITH NO JOINT CONSTRAINT

D

3D BODY IMAGE B1
BY MOTION VECTOR Δ*
WITH JOINT CONSTRAINT

IMAGE PROCESSING DEVICE, METHOD, AND PROGRAM, AND OBJECTIVE FUNCTION

CROSS REFERENCES TO RELATED APPLICATIONS

The present invention contains subject matter related to Japanese Patent Applications JP 2007-006630 and JP 2007-200477 filed in the Japanese Patent Office on Jan. 16, 2007 and Aug. 1, 2007, respectively, the entire contents of which being incorporated herein by reference.

BACKGROUND OF THE INVENTION

1. Field of the Invention

The present invention relates to an image processing device, method, and program, and an objective function and, more specifically, to an image processing device, method, and program, and an objective function suitable for use with three-dimensional (3D) body tracking for modeling, based on images being results of sequential imaging of an object such as human being in motion, the motion of the object using a 3D body configured by a plurality of parts.

2. Description of the Related Art

Figure 1:
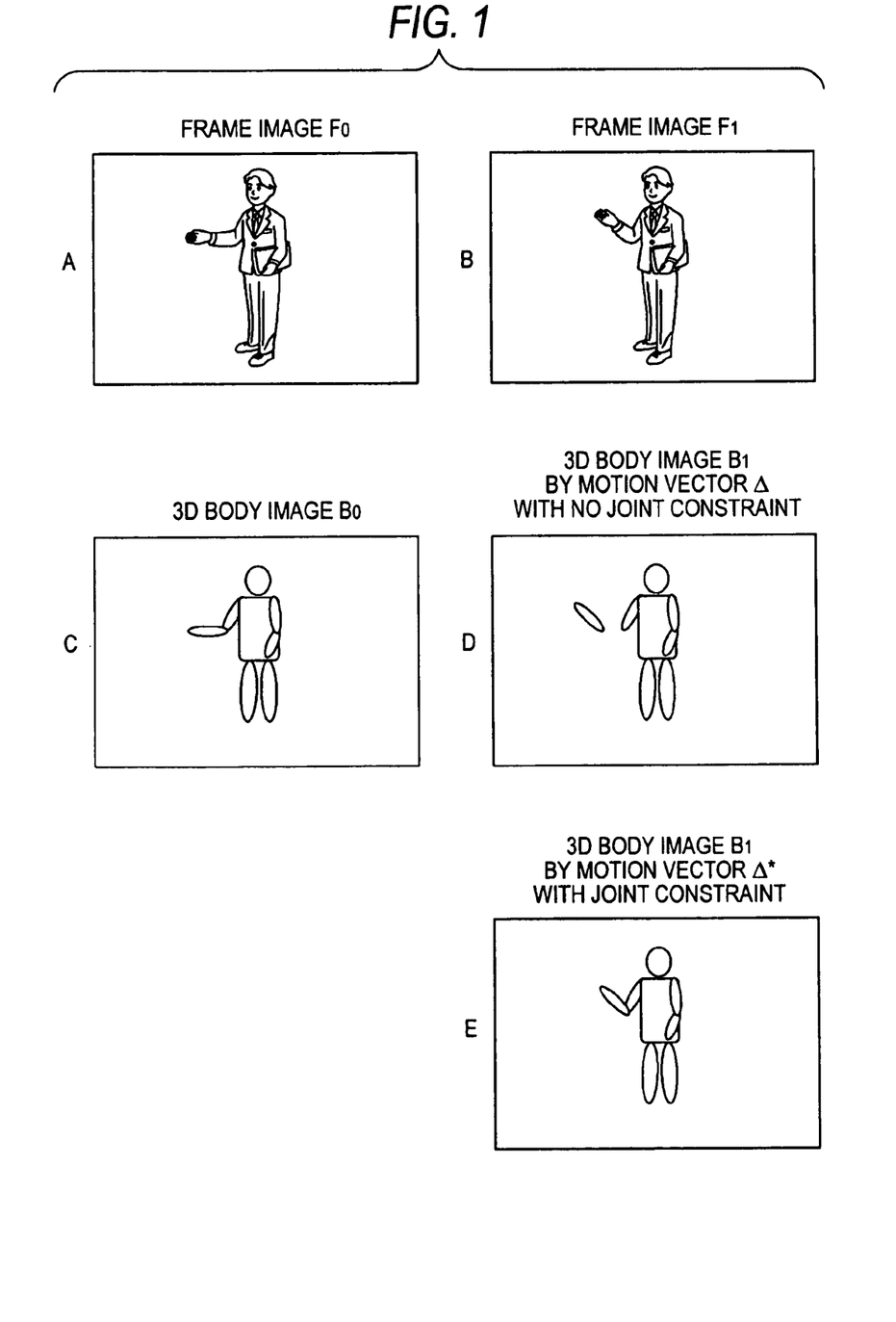
FIGS. 1A to 1E are each a diagram for illustrating the outline of three-dimensional (3D) body tracking.

With 3D body tracking, as exemplarily shown in FIGS. 1A and 1B, in frame images $F_0$ and $F_1$ being results of time-sequential imaging, an object in the frame image $F_0$ being a reference frame image is divided into several parts, e.g., part of head, part of torso, part of arm from shoulder to elbow, part of arm from elbow to finger tip, part of leg from lap to knee, part of leg from knee to toe, and others. Each of these parts is made three dimensional, and the resulting image is a 3D body image $B_0$. In such a 3D body image $B_0$, the motion of each of the parts is tracked based on the frame image $F_1$, thereby generating a 3D body image $B_1$ corresponding to the frame image $F_1$.

The concern here is that, at the time of tracking the motion of each of the parts, if the parts are individually subjected to such motion tracking, the parts that are supposed to be connected to each other by joints may be separated, e.g., refer to a 3D body image $B'_1$ of FIG. 1D. To prevent occurrence of such a problem, motion tracking is required to be performed in accordance with such requirements as "a part is being tangent to another at a predetermined joint point". Hereinafter, such requirements are referred to as joint constraints.

To meet such requirements, various many methods of tracking with joint constraints have been proposed, e.g., Non-Patent Document 1 (D. Demirdjian, T. Ko and T. Darrell. "Constraining Human Body Tracking". Proceedings of ICCV, vol. 2, pp. 1071, 2003), Non-Patent Document 2 (Christoph Bregler, Jitendra Malik and Katherine Pullen. "Twist Based Acquisition and Tracking of Animal and Human Kinematics". IJCV, vol. 56, no. 3, pp. 179-194, 2004), Non-Patent Document 3 (Steffen Knoop, Stefan Vacek, and Rudiger Dillmann. "Modeling Joint Constraints for an Articulated 3D Human Body Model with Artificial Correspondences in ICP". Proceedings of Humanoids, pp. 74-79, 2005), and Non-Patent Document 4 (Ivana Mikic, Mohan Trivedi, Edward Hunter and Pamela Cosman. "Human Body Model Acquisition and Tracking Using Voxel Data". IJCV, vol. 53, no. 3, pp. 199-223, 2003).

SUMMARY OF THE INVENTION

In the cited reference 1, e.g., Non-Patent Document 1, proposed is a method in which the ICP (Iterative Closest Point) register technique is used to compute individually the motion of each part, and the resulting motions are projected to the motion of satisfying joint constraints in a linear motion space. The direction of projection is determined by the correlation matrix $\Sigma^{-1}$ of ICP.

The advantages of determining the projection direction using the correlation matrix $\Sigma^{-1}$ of ICP are that the posture of the 3D body moved part by part by the projected motions will be closest to the actual posture of the object.

On the other hand, the disadvantages of determining the projection direction using the correlation matrix $\Sigma^{-1}$ of ICP are that the method cannot be applied to any image being a result of imaging by a single camera. This is because, with the ICP register technique, 3D decompression is performed based on any parallax observed between any two images being the results of simultaneous imaging by two cameras. There is another problem that the decision making about the projection direction is unstable because the accuracy and error of 3D decompression are largely dependent on the determination accuracy for the projection direction. Moreover, with the ICP register technique, the amount of computation is large and thus processing requires a long time.

It is thus desirable to enable 3D body tracking with less amount of computation, higher accuracy, and more stability compared with the ICP register technique.

According to a first embodiment of the present invention, there is provided an image processing device that models, based on a plurality of frame images being results of time-sequential imaging of an object in motion, a motion of the object using a three-dimensional (3D) body configured by a plurality of parts. The device includes: acquisition means for acquiring the frame images being the imaging results; estimation means for computing, based on a posture of the 3D body in any of the frame images selected for use as a reference, a first matrix of coordinates of a joint connecting the parts of the 3D body and a second matrix of coordinates of each of the parts of the 3D body, and generating a first motion vector with an estimation of a motion of each of the parts with no joint constraints based on the frame image subsequent to the reference frame image; computing means for computing, using the first and second matrixes being computation results by the estimation means and the first motion vector, a second motion vector with an estimation of the motion of each of the parts with the joint constraints for a predetermined objective function to satisfy predetermined requirements; and determination means for determining the 3D body corresponding to the subsequent frame image by transforming the 3D body in the reference frame image in accordance with the second motion vector being a computation result. In the image processing device, the predetermined requirements for the predetermined objective function are to minimize a difference between a posture of the 3D body being a result of transformation by the first motion vector and a posture of the 3D body being a result of the transformation by the second motion vector.

The estimation means can compute the first matrix of the coordinates of the joint connecting the parts of the 3D body based on the posture of the reference 3D body in the reference frame image being the imaging result for use as a reference, and for each of the parts of the 3D body, compute the second matrix of the coordinates of a plurality of points located in the parts but not observed on any same linear line, and generate the first motion vector estimated for the motion of each of the parts with no joint constraints based on the frame image subsequent to the reference frame image.

Also, with the predetermined objective function, based on an assumption that the motion of the object is small between the reference frame image and the subsequent frame image, the motion of the object denoted by a rotational motion about each of three axes being orthogonal to one another can be made linear.

Also, the motion of the object between the reference frame image and the subsequent frame image can be denoted using an absolute coordinates system.

Also, with the predetermined objective function, based on an assumption that the motion of the object is small between the reference frame image and the subsequent frame image, the motion of the objet denoted by a rotational motion about each of three axes being orthogonal to one another can be made linear.

Also, the motion of the object between the reference frame image and the subsequent frame image is denoted using a relative coordinates system.

Also, the predetermined objective function is $(\Delta^* - \Delta)^t C (\Delta^* - \Delta)$, and the computing means can compute the second motion vector for minimizing the predetermined objective function by $$\Delta^* = V(V^t C V)^{-1} V^t C \Delta$$

where $\Delta^*$ denotes the second motion vector, V denotes the first matrix, C denotes the second matrix, and $\Delta$ denotes the first motion vector.

According to a second embodiment of the present invention, there is provided an image processing method for use in an image processing device that models, based on a plurality of frame images being results of time-sequential imaging of an object in motion, a motion of the object using a three-dimensional (3D) body configured by a plurality of parts. The method includes the steps of: computing, based on a posture of the 3D body in any of the frame images selected for use as a reference, a first matrix of coordinates of a joint connecting the parts of the 3D body; computing a second matrix of coordinates of each of the parts of the 3D body; generating a first motion vector with an estimation of a motion of each of the parts with no joint constraints based on the frame image subsequent to the reference frame image; computing, using the first and second matrixes being computation results and the first motion vector, a second motion vector with an estimation of the motion of each of the parts with the joint constraints for a predetermined objective function to satisfy predetermined requirements; and determining the 3D body corresponding to the subsequent frame image by transforming the 3D body in the reference frame image in accordance with the second motion vector being a computation result. In the image processing method, the predetermined requirements for the predetermined objective function are to minimize a difference between a posture of the 3D body being a result of transformation by the first motion vector and a posture of the 3D body being a result of transformation by the second motion vector.

According to a third embodiment of the present invention, there is provided a program for use to control over a computer that models, based on a plurality of frame images being results of time-sequential imaging of an object in motion, a motion of the object using a three-dimensional (3D) body configured by a plurality of parts. The program allowing the computer to execute the steps of: computing, based on a posture of the 3D body in any of the frame images selected for use as a reference, a first matrix of coordinates of a joint connecting the parts of the 3D body; computing a second matrix of coordinates of each of the parts of the 3D body; generating a first motion vector with an estimation of a motion of each of the parts with no joint constraints based on the frame image subsequent to the reference frame image; computing, using the first and second matrixes being computation results and the first motion vector, a second motion vector with an estimation of the motion of each of the parts with the joint constraints for a predetermined objective function to satisfy predetermined requirements; and determining the 3D body corresponding to the subsequent frame image by transforming the 3D body in the reference frame image in accordance with the second motion vector being a computation result. In the program, the predetermined requirements for the predetermined objective function are to minimize a difference between a posture of the 3D body being a result of transformation by the first motion vector and a posture of the 3D body being a result of transformation by the second motion vector.

According to a fourth embodiment of the present invention, there is provided an objective function for use in a three-dimensional (3D) body tracking process of modeling, based on a plurality of frame images being results of time-sequential imaging of an object in motion, a motion of the object using a 3D body configured by a plurality of parts. In the objective function, an input is a first motion vector estimated for a motion of each of the parts of the 3D body with no joint constrains, and an output is a second motion vector estimated for the motion of each of the parts with the joint constraints, and a difference of posture is minimized between the 3D body being a result of transformation by the first motion vector and the 3D body being a result of transformation by the second motion vector.

In the embodiments of the invention, based on the posture of a 3D body in any of frame images being imaging results selected for use as a reference, computed are a first matrix of coordinates of joint connecting parts of the 3D body and a second matrix of coordinates of each of the parts of the 3D body. A first motion vector is also generated with an estimation of the motion of each of the parts with no joint constraints based on the frame image subsequent to the reference frame image. Using the first and second matrixes being computation results by the estimation means and the first motion vector, in such a manner that a predetermined objective function satisfies predetermined condition, a second motion vector is computed with an estimation of the motion of each of the parts with the joint constraints. The 3D body in the reference frame image is transformed in accordance with the second motion vector being a computation result so that the 3D body corresponding to the subsequent frame image is determined. Herein, the predetermined requirements for the predetermined objective function are to minimize a difference between the posture of the 3D body being a result of transformation by the first motion vector and the posture of the 3D body being a result of the transformation by the second motion vector.

In another embodiment of the invention, an input is a first motion vector estimated for the motion of each part of a 3D body with no joint constrains, and an output is a second motion vector estimated for the motion of each of the parts with the joint constraints so that the output is the second motion vector for minimizing a difference of posture between the 3D body being a result of transformation by the first motion vector and the 3D body being a result of transformation by the second motion vector.

According to an embodiment of the invention, 3D body tracking can be performed with less amount of computation, higher accuracy, and more stability compared with the ICP register technique.

According to another embodiment of the invention, a first motion vector with no joint constraints is used as a basis to determine a second motion vector for minimizing a difference of posture between a 3D body being a result of transformation by the first motion vector and a 3D body being a result of transformation by the second motion vector.

DESCRIPTION OF THE PREFERRED EMBODIMENT

Prior to describing embodiments of the invention below, exemplified is a correlation among claimed components and embodiments in this specification or in the accompanying drawings. This is aimed to prove that an embodiment provided for the purpose of supporting the description of claims is described in the specification or in the accompanying drawings. Therefore, even if there is any specific embodiment found in the specification or in the accompanying drawings but not found here for the components described in the an embodiment of the invention, it does not mean that the embodiment is not correlated with the components. On the other hand, even if there is any specific embodiment found here for the components, it does not mean that the embodiment is only correlated with the components.

An embodiment of the invention is directed to an image processing device (e.g., image processing device 10 of FIG. 3) that models, based on a plurality of frame images being results of time-sequential imaging of an object in motion, a motion of the object using a three-dimensional (3D) body configured by a plurality of parts. The device includes: acquisition means (e.g., frame image acquisition section 11 of FIG. 3) for acquiring the frame images being the imaging results; estimation means (e.g., estimation section 12 of FIG. 3) for computing, based on a posture of the 3D body in any of the frame images selected for use as a reference, a first matrix (e.g., matrix V) of coordinates of a joint connecting the parts of the 3D body and a second matrix (e.g., matrix C) of coordinates of each of the parts of the 3D body, and generating a first motion vector (e.g., motion vector Δ) with an estimation of a motion of each of the parts with no joint constraints based on the frame image subsequent to the reference frame image; computing means (e.g., motion vector determination section 13 of FIG. 3) for computing, using the first and second matrixes being computation results by the estimation means and the first motion vector, a second motion vector (e.g., motion vector Δ*) with an estimation of the motion of each of the parts with the joint constraints for a predetermined objective function to satisfy predetermined requirements; and determination means (e.g., 3D body image generation section 14 of FIG. 3) for determining the 3D body corresponding to the subsequent frame image by transforming the 3D body in the reference frame image in accordance with the second motion vector being a computation result. In the image processing device, the predetermined requirements for the predetermined objective function are to minimize a difference between a posture of the 3D body being a result of transformation by the first motion vector and a posture of the 3D body being a result of the transformation by the second motion vector.

Figure 4:
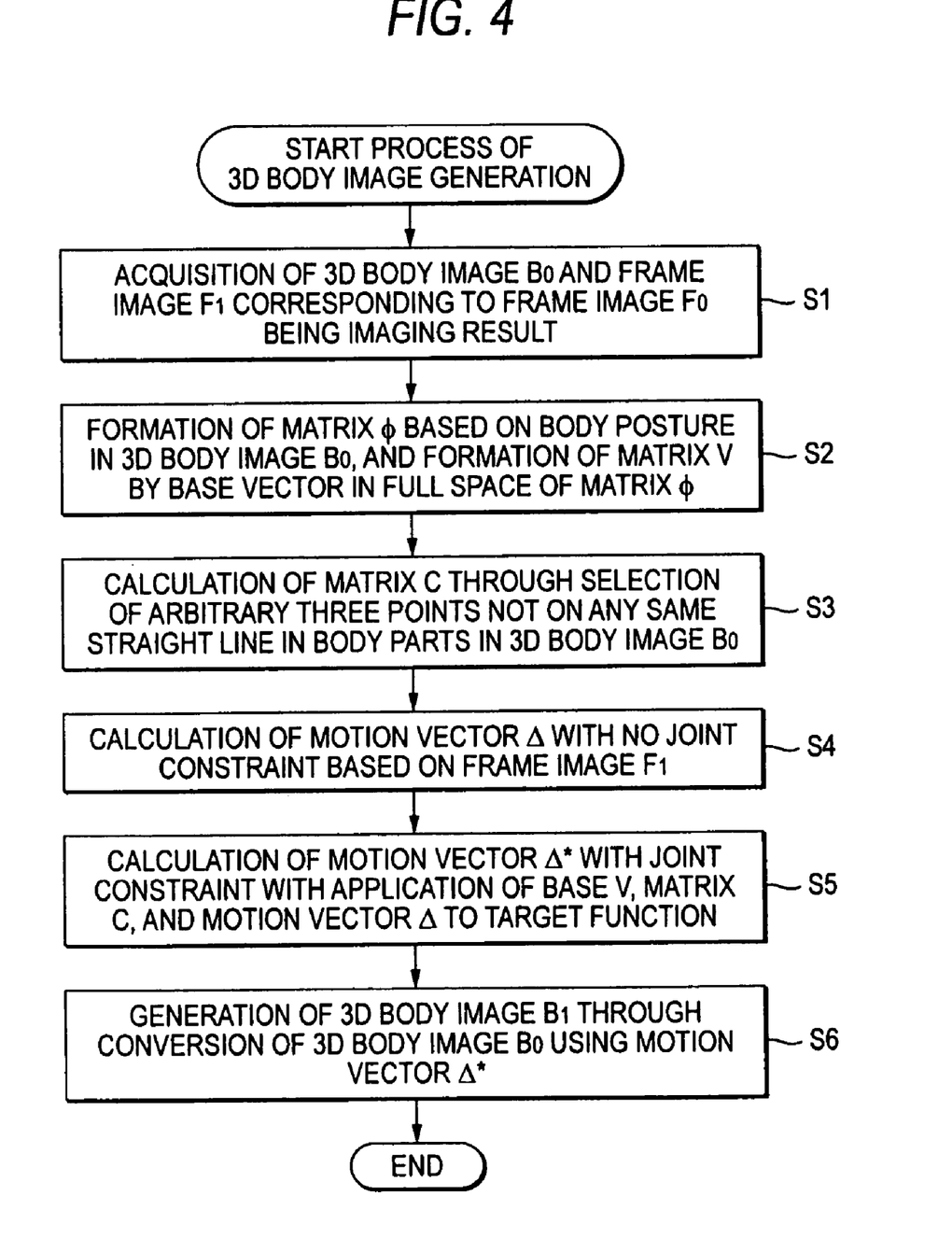
FIG. 4 is a flowchart of a process of 3D body image generation.

Another embodiment of the invention is directed to an image processing method including the steps of, and a program allowing a computer to execute the steps of: computing, based on a posture of the 3D body in any of the frame images selected for use as a reference, a first matrix of coordinates of a joint connecting the parts of the 3D body (e.g., step S2 of FIG. 4); computing a second matrix of coordinates of each of the parts of the 3D body (e.g., step S3 of FIG. 4); generating a first motion vector with an estimation of a motion of each of the parts with no joint constraints based on the frame image subsequent to the reference frame image (e.g., step S4 of FIG. 4); computing, using the first and second matrixes being computation results and the first motion vector, a second motion vector with an estimation of the motion of each of the parts with the joint constraints for a predetermined objective function to satisfy predetermined requirements (e.g., step S5 of FIG. 5); and determining the 3D body corresponding to the subsequent frame image by transforming the 3D body in the reference frame image in accordance with the second motion vector being a computation result (e.g., step S6 of FIG. 4). In the method and program, the predetermined requirements for the predetermined objective function are to minimize a difference between a posture of the 3D body being a result of transformation by the first motion vector and a posture of the 3D body being a result of transformation by the second motion vector.

In the below, a specific embodiment to which the invention is applied is described in detail by referring to the accompanying drawings.

In the embodiment of the invention, for the purpose of implementing three-dimensional (3D) body tracking described by referring to FIGS. 1A to 1E, proposed is a method for computing a motion vector Δ* with joint constraints by which the parts of a body are integrated in motion. This computation is performed based on motion vectors Δ with no joint constraints being the results of individual tracking of the parts of the body. Also proposed is a method for enabling generation of a 3D body image $B_1$ of a current frame by applying the motion vector Δ* to a 3D body image $B_0$ of a frame preceding the current frame.

In this embodiment of the invention, the motion of each part in a 3D body, i.e., change of position and posture, is denoted in two ways, thereby deriving any optimal objective function using such two ways of denoting.

Described first is a first way of denoting. For denoting the motion of rigid portions of a body, i.e., corresponding to the parts of the body, in a three-dimensional space, linear transformation with a 4×4 transformation matrix has been popularly used. With the first way of denoting, the motion of all of the rigid portions is denoted by the combination of the rotational motion with respect to a predetermined axis, and translational motion horizontally along the axis. Such a combination of the rotational motion and the translational motion is referred to as spiral motion.

Figure 2:
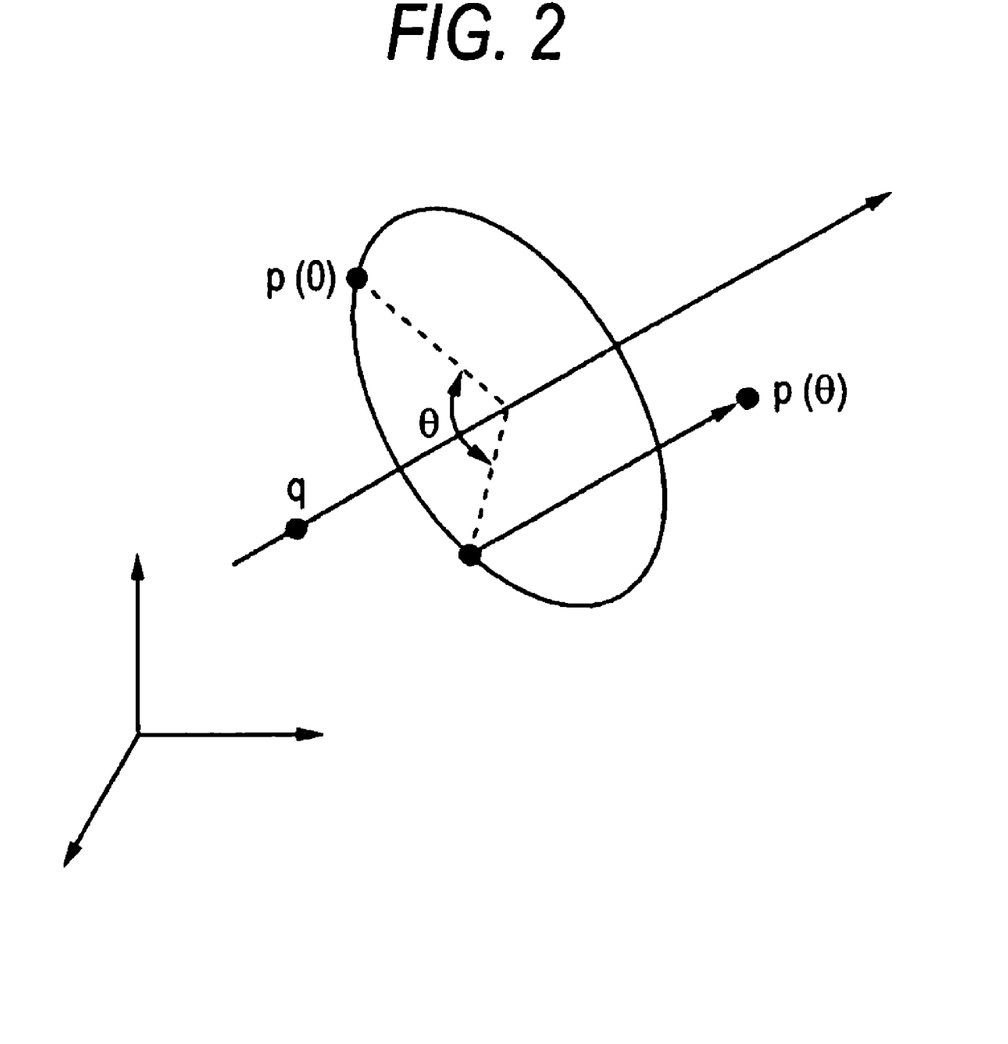
FIG. 2 is a diagram for illustrating the spiral motion of the rigid portion of a body.

As shown in FIG. 2, for example, when a rigid portion is moved from a point p(0) to a point p(θ) by the spiral motion of a rotation angle θ, this motion is denoted using an exponent as shown in Equation 1 below.

$$\bar{p}(\theta) = e^{\hat{\xi}\theta} \bar{p}(0) \quad (1)$$

In Equation 1, $e^{\hat{\xi}\theta}$ (for convenience, ˆ above ξ is omitted in this specification, and this is applicable also to below) represents the motion (transformation) G of a rigid portion. The motion G is denoted as in Equation 2 below by Taylor expansion.

$$G = e^{\hat{\xi}\theta} = I + \hat{\xi}\theta + \frac{(\hat{\xi}\theta)^2}{2!} + \frac{(\hat{\xi}\theta)^3}{3!} + \ldots \qquad (2)$$

In Equation 2, I represents a unit matrix. In the exponent part, $\xi$ denotes the spiral motion, and is denoted by a 4×4 matrix of Equation 3 below or by a six-dimensional vector.

$$\hat{\xi} = \begin{bmatrix} 0 & -\xi_3 & \xi_2 & \xi_4 \\ \xi_3 & 0 & -\xi_1 & \xi_5 \\ -\xi_2 & \xi_1 & 0 & \xi_6 \\ 0 & 0 & 0 & 0 \end{bmatrix} \qquad (3)$$

$$\xi = [\xi_1, \xi_2, \xi_3, \xi_4, \xi_5, \xi_6]^t$$

where $$\xi_1^2 + \xi_2^2 + \xi_3^2 = 1 \qquad (4)$$

Accordingly, $\xi\theta$ is denoted as in Equation 5 below.

$$\hat{\xi}\theta = \begin{bmatrix} 0 & -\xi_3\theta & \xi_2\theta & \xi_4\theta \\ \xi_3\theta & 0 & -\xi_1\theta & \xi_5\theta \\ -\xi_2\theta & \xi_1\theta & 0 & \xi_6\theta \\ 0 & 0 & 0 & 0 \end{bmatrix} \qquad (5)$$

$$\xi\theta = [\xi_1\theta, \xi_2\theta, \xi_3\theta, \xi_4\theta, \xi_5\theta, \xi_6\theta]^t$$

Note that, among six independent variables of $\xi\theta$, i.e., $\xi_1\theta$, $\xi_2\theta, \xi_3\theta, \xi_4\theta, \xi_5\theta$, and $\xi_6\theta$, the first three $\xi_1\theta$ to $\xi_3\theta$ are related to the rotational motion in the spiral motion, and the next three $\xi_4\theta$ to $\xi_6\theta$ are related to the translational motion in the spiral motion.

Herein, assuming that "the amount of motion of a rigid portion is small between any successive frame images $F_0$ and $F_1$", the third term and thereafter in Equation 2 can be omitted, and the motion (transformation) G of the rigid portion can be made linear as shown in Equation 6 below.

$$G \cong I + \hat{\xi}\theta \qquad (6)$$

When the amount of motion of the rigid portion is large between the successive frame images $F_0$ and $F_1$, increasing the frame rate at the time of imaging can reduce the amount of motion between the frame images. As such, the assumption of "the amount of motion of a rigid portion is small between any successive frame images $F_0$ and $F_1$" can be always true, and thus Equation 6 is adopted for the motion (transformation) G of a rigid portion.

Considered next is the motion of a 3D body configured by N pieces of parts, i.e., N pieces of rigid portions. As described in the foregoing, because the motion of each of the parts is denoted by a vector of $\xi\theta$, the motion vector $\Delta$ of a 3D body with no joint constraints is denoted by N pieces of vector of $\xi\theta$ as shown in Equation 7 below.

$$\Delta = [[\xi\theta]_1^t, \ldots, [\xi\theta]_N^t]^t \qquad (7)$$

The N pieces of vector of $\xi\theta$ are each including six independent variables $\xi_1\theta$ to $\xi_6\theta$, and thus the motion vector $\Delta$ of the 3D body will be of 6N-dimensional.

For simplification of Equation 7, as in Equation 8 below, among six independent variables of $\xi\theta$, i.e., $\xi_1\theta, \xi_2\theta, \xi_3\theta$, $\xi_4\theta, \xi_5\theta$, and $\xi_6\theta$, the first three $\xi_1\theta$ to $\xi_3\theta$ related to the rotational motion in the spiral motion are each denoted by a 3D vector $r_i$, and the next three $\xi_4\theta$ to $\xi_6\theta$ related to the translational motion in the spiral motion are each denoted by a 3D vector $t_i$.

$$r_i = \begin{bmatrix} \xi_1\theta \\ \xi_2\theta \\ \xi_3\theta \end{bmatrix}_i \qquad (8)$$

$$t_i = \begin{bmatrix} \xi_4\theta \\ \xi_5\theta \\ \xi_6\theta \end{bmatrix}_i$$

As a result, Equation 7 can be simplified as shown in Equation 9.

$$\Delta = [[r_1]^t, [t_1]^t, \ldots, [r_N]^t, [t_N]^t]^t \qquad (9)$$

The N pieces of part configuring the 3D body are actually required to be under the joint constrains. In consideration thereof, described next is a method for computing a motion vector $\Delta^*$ of a 3D body with joint constraints from a motion vector $\Delta$ of a 3D body with no joint constraints.

Note that, the following description is given based on the idea that the difference of posture is minimum between the 3D body after transformation by the motion vector $\Delta$ and the 3D body after transformation by the motion vector $\Delta^*$.

To be specific, any arbitrary three points are first determined for each of the parts configuring a 3D body. Herein, the three points should not be located on any same linear line. Thereafter, computed is a motion vector $\Delta^*$ with which the difference of posture, i.e., the point-to-point distance, can be minimized from the 3D body after transformation by the motion vector $\Delta$ to the 3D body after transformation by the motion vector $\Delta^*$.

Assuming that the number of joints in a 3D body is M, the motion vector $\Delta^*$ of the 3D body with joint constraints will be in the null space $\{\Phi\}$ of a 3M×6N joint-constraint matrix $\Phi$ formed by coordinates of the joints as described in Non-Patent Document 1 described above.

Described next is the joint-constraint matrix $\Phi$. The M pieces of a joint are denoted by $J_i$ (where i=1, 2, ..., and M), and an index of the parts connected to each other by the joints $J_i$ is denoted by $m_i$ and $n_i$ so that a 3×6N sub-matrix of Equation 10 below is generated for each of the joints $J_i$.

$$\text{submatrix}_i(\phi) = (0_3 \ldots \overset{m_i}{(J_i)_x} \overset{m_i+1}{-I_3} \ldots \overset{n_i}{-(J_i)_x} \overset{n_i+1}{I_3} \ldots 0_3) \qquad (10)$$

Note that, in Equation 10, $0_3$ denotes a null matrix of 3×3, and $I_3$ is a unit matrix of 3×3.

The M pieces of the 3×6N sub-matrix formed as such are arranged in a row so that a matrix of 3M×6N of Equation 11 is formed. The resulting matrix is the joint-constraint matrix $\Phi$.

$$\phi = \begin{pmatrix} \text{submatrix}_1(\phi) \\ \text{submatrix}_2(\phi) \\ \vdots \\ \text{submatrix}_M(\phi) \end{pmatrix} \qquad (11)$$

In a part i (i=1, 2, ..., and N) among the N pieces of the part configuring the 3D body, when any arbitrary three points not located on any same linear line are $\{P_{i1}, P_{i2}, P_{i3}\}$, the objective function will be as shown in Equation 12 below.

$$\begin{cases} \underset{\Delta^*}{\operatorname{argmin}} \sum_{i=1}^{N} \sum_{j=1}^{3} \|p_{ij} + r_i \times p_{ij} + t_i - (p_{ij} + r_i^* \times p_{ij} + t_i^*)\|^2 \\ \Delta^* \in nullspace\{\phi\} \end{cases} \quad (12)$$

$$\Delta = [[r_1]^t, [t_1]^t, \ldots, [r_N]^t, [t_N]^t]^t$$

$$\Delta^* = [[r_1^*]^t, [t_1^*]^t, \ldots, [r_N^*]^t, [t_N^*]^t]^t$$

The objective function of Equation 12 is expanded, and Equation 13 is derived.

$$\begin{aligned} \text{objective} &= \underset{\Delta^*}{\operatorname{argmin}} \sum_i \sum_j \left\| [-(p_{ij})_x I] \left( \begin{bmatrix} r_i^* \\ t_i^* \end{bmatrix} - \begin{bmatrix} r_i \\ t_i \end{bmatrix} \right) \right\|^2 \\ &= \underset{\Delta^*}{\operatorname{argmin}} \sum_i \sum_j \left( \begin{bmatrix} r_i^* \\ t_i^* \end{bmatrix} - \begin{bmatrix} r_i \\ t_i \end{bmatrix} \right)^t [-(p_{ij})_x I]^t \\ &\quad [-(p_{ij})_x I] \left( \begin{bmatrix} r_i^* \\ t_i^* \end{bmatrix} - \begin{bmatrix} r_i \\ t_i \end{bmatrix} \right) \\ &= \underset{\Delta^*}{\operatorname{argmin}} \sum_i \left( \begin{bmatrix} r_i^* \\ t_i^* \end{bmatrix} - \begin{bmatrix} r_i \\ t_i \end{bmatrix} \right)^t \\ &\quad \left\{ \sum_j [-(p_{ij})_x I]^t [-(p_{ij})_x I] \right\} \left( \begin{bmatrix} r_i^* \\ t_i^* \end{bmatrix} - \begin{bmatrix} r_i \\ t_i \end{bmatrix} \right) \end{aligned} \quad (13)$$

Note that, in Equation 13, an operator $(\cdot)_x$ means formation of a 3×3 matrix as $$p = \begin{bmatrix} x \\ y \\ z \end{bmatrix}$$

when 3D coordinates p are denoted as $$(p)_x = \begin{bmatrix} 0 & -z & y \\ z & 0 & -x \\ -y & x & 0 \end{bmatrix}$$

Herein, a 6×6 matrix $C_{ij}$ is defined as Equation 14 below.

$$c_{ij} = [-(p_{ij})_x I]^t [-(p_{ij})_x I] \quad (14)$$

With the definition of Equation 14, the objective function is organized as Equation 15 below.

$$\begin{cases} \underset{\Delta^*}{\operatorname{argmin}} (\Delta^* - \Delta)^t C(\Delta^* - \Delta) \\ \Delta^* \in nullspace\{\phi\} \end{cases} \quad (15)$$

Note that C in Equation 15 is a 6N×6N matrix of Equation 16 below.

$$C = \begin{pmatrix} \sum_{j=1}^{3} c_{1j} & \cdots & 0 \\ \vdots & \ddots & \vdots \\ 0 & \cdots & \sum_{j=1}^{3} c_{Nj} \end{pmatrix}_{6N \times 6N} \quad (16)$$

The objective function of Equation 15 can be solved similarly to the method in Non-Patent Document 1. That is, by an SVD algorithm, (6n−3m) pieces of a 6N-dimensional base vector $\{v1, v2, \ldots vK\}$ (where K=1, ..., and 6N−3M) are extracted from the null space of the joint-constraint matrix $\Phi$. As is belonging to the null space of the joint-constraint matrix $\Phi$, the motion vector $\Delta^*$ is denoted as in Equation 17 below.

$$\Delta^* = \lambda_1 v_1 + \lambda_2 v_2 + \ldots + \lambda_K v_K \quad (17)$$

Moreover, with the definition of a 6N×(6N−3M) matrix $V=[v1, v2, \ldots, vK]$, Equation 17 will be as expressed by Equation 18 below. Herein, the 6N×(6N−3M) matrix is the one formed by arranging, in line, a vector $\delta=(\lambda_1, \lambda_2, \ldots, \lambda_K)^t$, and the extracted base vectors in the null space of the 6N-dimensional joint-constraint matrix $\Phi$.

$$\Delta^* = V\delta \quad (18)$$

In the objective function of Equation 15, by substitution of $\Delta^* = V\delta$ in Equation 18 to $(\Delta^* - \Delta)^t C (\Delta^* - \Delta)$, the result will be Equation 19 below.

$$(V\delta - \Delta)^t C (V\delta - \Delta) \quad (19)$$

Assuming that the difference in Equation 19 is 0, the vector $\delta$ is denoted as in Equation 20 below.

$$\delta = (V^t C V)^{-1} V^t C \Delta \quad (20)$$

As such, based on Equation 18, the motion vector $\Delta^*$ considered optimal for minimization of the objective function is denoted as in Equation 21 below. Using Equation 21 enables to compute an optimal motion vector $\Delta^*$ with joint constraints from a motion vector $\Delta$ with no joint constraints.

$$\Delta^* = V(V^t C V)^{-1} V^t C \Delta \quad (21)$$

In Non-Patent Document 1 described above, Equation 22 below is indicated as an equation of computing an optimal motion vector $\Delta^*$ with joint constraints from a motion vector $\Delta$ with no joint constraints.

$$\Delta^* = V(V^t \Sigma^{-1} V)^{-1} V^t \Sigma^{-1} \Delta \quad (22)$$

In Equation 22, $\Sigma^{-1}$ denotes a correlation matrix of ICP.

Equation 22 in Non-Patent Document 1 looks similar to Equation 21 in the embodiment of the invention, only with a difference of $\Sigma^{-1}$ being replaced with C. However, Equation 21 in the embodiment of the invention is totally different from Equation 22 in Non-Patent Document 1 in terms of a process of derivation.

With Non-Patent Document 1, derived is the objective function of minimizing the Mahalanobis distance between a motion vector $\Delta^*$ belonging in the null space of the joint-constraint matrix $\Phi$ and a motion vector $\Delta$, and based on the correlation between the motion vectors $\Delta$ in terms of size, the correlation matrix $\Sigma^{-1}$ of ICP is computed.

On the other hand, in the embodiment of the invention, derived is the objective function of minimizing the difference of posture between a 3D body after transformation by a motion vector $\Delta$ and a 3D body after transformation by a motion vector $\Delta^*$. As such, with Equation 21 in this embodiment of the invention, the ICP register technique is not using, thereby enabling to determine the projection direction with stability with no dependence on the accuracy of 3D decompression. Further, no restriction is imposed on the manner of imaging of frame images. Still further, compared with Non-Patent Document 1 using the ICP register technique, the amount of computation can be reduced.

Described next is a second way of denoting for the motion of each of the parts of a 3D body.

With the second way of denoting, the posture of each of the parts of a 3D body is represented by a starting point in the world coordinates system, i.e., origin in the relative coordinates system, and a rotation angle about axes of x, y, and z, respectively, in the world coordinates system. Generally, the rotation about the axis of x in the world coordinates system is referred to as Roll, the rotation about the axis of y therein is referred to as Pitch, and the rotation about the axis of z therein is referred to as Yaw.

In the below, the starting point of the part i of the 3D body in the world coordinates system is assumed as $(x_i, y_i, z_i)$, and the rotation angles of Roll, Pitch, and Yaw are $\alpha_i$, $\beta_i$, and $\gamma_i$, respectively. In this case, the posture of the part i is expressed by a six-dimensional vector below.

$[\alpha_i, \beta_i, \gamma_i, x_i, y_i, z_i]^t$

The posture of a rigid portion is generally represented by a Homogeneous transformation matrix being a 4×4 matrix, and hereinafter, such a matrix is referred to as H-matrix or transformation matrix. The H-matrix corresponding to the part i can be computed through application of, to Equation 23 below, the starting point of $(x_i, y_i, z_i)$ in the world coordinates system, and the rotation angles of Roll, Pitch, and Yaw, i.e., $\alpha_i$, $\beta_i$, and $\gamma_i$ (rad).

$$G(\alpha_i, \beta_i, \gamma_i, x_i, y_i, z_i) = \begin{bmatrix} 1 & 0 & 0 & x_i \\ 0 & 1 & 0 & y_i \\ 0 & 0 & 1 & z_i \\ 0 & 0 & 0 & 1 \end{bmatrix} \quad (23)$$

$$\begin{bmatrix} \cos\gamma_i & -\sin\gamma_i & 0 & 0 \\ \sin\gamma_i & \cos\gamma_i & 0 & 0 \\ 0 & 0 & 1 & 0 \\ 0 & 0 & 0 & 1 \end{bmatrix}$$

$$\begin{bmatrix} \cos\beta_i & 0 & \sin\beta_i & 0 \\ 0 & 1 & 0 & 0 \\ -\sin\beta_i & 0 & \cos\beta_i & 0 \\ 0 & 0 & 0 & 1 \end{bmatrix} \begin{bmatrix} 1 & 0 & 0 & 0 \\ 0 & \cos\alpha_i & -\sin\alpha_i & 0 \\ 0 & \sin\alpha_i & \cos\alpha_i & 0 \\ 0 & 0 & 0 & 1 \end{bmatrix}$$

With the motion of a rigid portion, the 3D position of an arbitrary point X in the part i of a frame image $F_n$ can be computed by Equation 24 using the H-matrix.

$$X^n = P_i + G(d\alpha_i, d\beta_i, d\gamma_i, dx_i, dy_i, dz_i) \cdot (X^{n-1} - P_i) \quad (24)$$

Herein, $G(d\alpha_i, d\beta_i, d\gamma_i, dx_i, dy_i, dz_i)$ is a 4×4 matrix derived by substituting a computation result into Equation 23. The computation result is of the amount of motion change $d\alpha_i$, $d\beta_i$, $d\gamma_i$, $dx_i$, $dy_i$, $dz_i$ being computed by tracking using a particle filter or others in the part i between any successive frame images $F_{n-1}$ and $F_n$. $P_i = (x_i, y_i, z_i)^t$ is the starting point in the frame image $F_{n-1}$ in the part i.

In Equation 24, on the precondition that "the amount of motion of a rigid portion is small between the successive frame images $F_{n-1}$ and $F_n$", the amount of change observed to the rotation angles will be minimized so that approximation of $\sin x \approx x$ and $\cos x \approx 1$ is established. The second term and thereafter in the polynomial will be 0, and thus can be omitted. As such, the transformation matrix $G(d\alpha_i, d\beta_i, d\gamma_i, dx_i, dy_i, dz_i)$ in Equation 24 can be approximated as shown in Equation 25 below.

$$G(d\alpha_i, d\beta_i, d\gamma_i, dx_i, dy_i, dz_i) = \begin{bmatrix} 1 & -d\gamma_i & d\beta_i & dx_i \\ d\gamma_i & 1 & -d\alpha_i & dy_i \\ -d\beta_i & d\alpha_i & 1 & dz_i \\ 0 & 0 & 0 & 1 \end{bmatrix} \quad (25)$$

As is evident from Equation 25, paying attention to the portion related to rotation in the transformation matrix G, i.e., 3×3 in upper left, being in the form of a unit matrix plus an outer matrix, Equation 24 is changed thereby to Equation 26.

$$X^n = P_i(X^{n-1} - P_i) + \begin{bmatrix} d\alpha_i \\ d\beta_i \\ d\gamma_i \end{bmatrix} \times (X^{n-1} - P_i) + \begin{bmatrix} dx_i \\ dy_i \\ dz_i \end{bmatrix} \quad (26)$$

Moreover, Equation 26 is organized as Equation 27 below with replacement of the terms in Equation 26, $$\begin{bmatrix} d\alpha_i \\ d\beta_i \\ d\gamma_i \end{bmatrix}$$

and $$\begin{bmatrix} dx_i \\ dy_i \\ dz_i \end{bmatrix},$$

with $r_i$ and $t_i$, respectively.

$$X^n = X^{n-1} + r_i \times (X^{n-1} - P_i) + t_i \quad (27)$$

The parts configuring a 3D body are each coupled to any other parts by a joint. Assuming that the part i is coupled with a part j by a joint $J_{ij}$, the requirements in the frame image $F_n$ for the coupling between the parts i and j, i.e., joint constrains requirements, are expressed as in Equation 28.

$$r_i \times (J_{ij} - P_i) + t_i = t_j -$$

$$(J_{ij} - P_i) \times r_i + t_i - t_j = 0$$

$$[J_{ij} - P_i] \times r_i - t_i + t_j = 0 \quad (28)$$

Note that the operator $[\cdot]_x$ in Equation 28 is the same as that in Equation 13.

The joint constraints requirements are as below for an entire 3D body configured by N pieces of a part and M pieces of a joint. That is, the M pieces of a joint are denoted by $J_k$ (where $k=1, 2, \ldots,$ and M), and an index of any two parts coupled by the joint $J_k$ are denoted by $i_k$ and $j_k$. As such, formed for each of the joints $J_k$ is a 3×6N sub-matrix of Equation 29 below.

$$submatrix_k(\phi) = \left( 0_3 \ldots [J_k - P_{i_k}]_x \overset{i_k}{\phantom{X}} -I_3 \overset{i_k+1}{\phantom{X}} \ldots 0_3 \overset{j_k}{\phantom{X}} I_3 \overset{j_k+1}{\phantom{X}} \ldots 0_3 \right) \quad (29)$$

Note that, in Equation 29, $0_3$ denotes a null matrix of 3×3, and $I_3$ denotes a unit matrix of 3×3.

By arranging the M pieces of a 3×6N sub-matrix derived as such in a row, formed is a 3M×6N matrix in Equation 30 below. The resulting matrix is the joint-constraint matrix $\Phi$.

$$\phi = \begin{bmatrix} submatrix_1(\phi) \\ submatrix_2(\phi) \\ \vdots \\ submatrix_M(\phi) \end{bmatrix} \quad (30)$$

Similarly to Equation 9 described above, a 6N-dimensional motion vector $\Delta$ is formed by arranging in order $r_i$ and $t_i$, and the result is Equation 31 below. Herein, $r_i$ and $t_i$ each represent the amount of change between the frame images $F_{n-1}$ and $F_n$ in the 3D body.

$$\Delta = [[r_1]^t, [t_1]^t, \ldots, [r_N]^t, [t_N]^t]^t \quad (31)$$

Accordingly, the conditional equation of joint constraints for the 3D body is expressed as Equation 32.

$$\Phi\Delta = 0 \quad (32)$$

Note here that Equation 32 means, mathematically, that the motion vector $\Delta$ is included in the null space $\{\Phi\}$ of the joint-constraint matrix $\Phi$, i.e., described as Equation 33 below.

$$\Delta \in \text{null space}\{\Phi\} \quad (33)$$

Based on the motion vector $\Delta$ and the conditional equation of joint constraints 32 derived as such, if any three arbitrary points not located on any same linear line are denoted as $\{P_{i1}, P_{i2}, P_{i3}\}$ for the part i (where i=1, 2, ..., and N) among N pieces of a part configuring a 3D body, the equation of the objective function will be similar to that of Equation 12.

Note here that, with the first way of denoting, the motion of a 3D body is denoted by the spiral motion, and coordinates of any arbitrary three points not located on the same linear line are represented in an absolute coordinates system. On the other hand, with the second way of denoting, the motion of a 3D body is denoted by the rotational motion with respect to the origin and axes of x, y, and z of the absolute coordinates system, and any arbitrary three points not located on any same linear line in the part i are represented in a relative coordinates system in which the origin is the starting point $P_i$ of the part i. With such a difference, the objective function corresponding to the second way of function is expressed as Equation 34 below.

$$\begin{cases} \underset{\Delta^*}{\operatorname{argmin}} \sum_{i=1}^{N} \sum_{j=1}^{3} \left\| \begin{matrix} p_{ij} - P_i + r_i \times (p_{ij} - P_i) + t_i - \\ (p_{ij} - P_i + r_i^* \times (p_{ij} - P_i) + t_i^*) \end{matrix} \right\|^2 \\ \Delta^* \in \text{nullspace}\{\phi\} \end{cases} \quad (34)$$

$$\Delta = [[r_1]^t, [t_1]^t, \ldots, [r_N]^t, [t_N]^t]^t$$

$$\Delta^* = [[r_1^*]^t, [t_1^*]^t, \ldots, [r_N^*]^t, [t_N^*]^t]^t$$

The process for computing any optimal motion vector $\Delta^*$ by expanding and organizing the objective function in Equation 34 is similar to the process for computing any optimal motion vector $\Delta^*$ by expanding and organizing the objective function corresponding to the first way of denoting described above, i.e., the process for deriving Equation 21 from Equation 12. However, in the process corresponding to the second way of denoting, as an alternative to the 6×6 matrix $C_{ij}$, i.e., Equation 14, defined by the process corresponding to the first way of denoting, the 6×6 matrix $C_{ij}$ in Equation 35 is defined for use.

$$C_{ij} = [-[p_{ij} - P_i]_x I]^t \cdot [-[p_{ij} - P_i]_x I] \quad (35)$$

The optimal motion vector $\Delta^*$ eventually computed with the second way of denoting will be $$\Delta^* = [d\alpha_0^*, d\beta_0^*, d\gamma_0^*, dx_0^*, dy_0^*, dz_0^*, \ldots]^t$$

and this is a motion parameter itself. As such, the motion vector $\Delta^*$ can be used as it is for generation of a 3D body in the next frame image.

Described next is an image processing device in which Equation 21 in the embodiment of the invention is used for 3D body tracking, and as shown in FIGS. 1A to 1E, a 3D body image $B_1$ is generated from frame images $F_0$ and $F_1$ being results of time-sequential imaging of an object.

Figure 3:
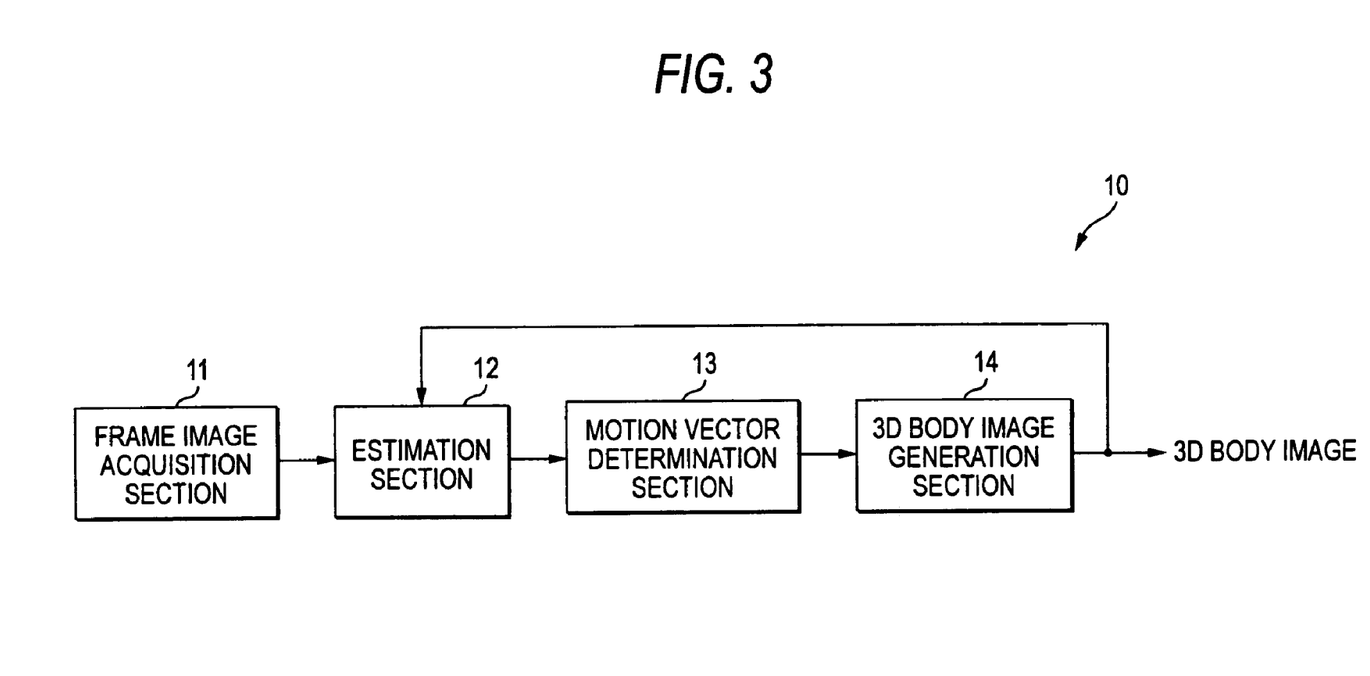
FIG. 3 is a block diagram showing an exemplary configuration of an image processing device to which the invention is applied.

FIG. 3 shows an exemplary configuration of the image processing device. This image processing device 10 is configured to include a frame image acquisition section 11, an estimation section 12, a motion vector determination section 13, and a 3D body image generation section 14. The frame image acquisition section 11 serves to acquire a frame image being a result of imaging using a camera or others. The estimation section 12 serves to estimate the motion of the parts configuring a 3D body, i.e., corresponding to the motion vector $\Delta$ with no joint constraints. This estimation is made based on the current frame image and an image of the 3D body corresponding to a frame image preceding the current frame image. The motion vector determination section 13 determines the motion vector $\Delta^*$ with joint constraints by applying the estimation result to Equation 21. The 3D body image generation section 14 serves to generate a 3D body image corresponding to the current frame through transformation of the 3D body image generated corresponding to the frame image preceding the current frame using the described motion vector $\Delta^*$ with joint constraints.

Described next is a process of 3D body image generation by the image processing device 10. Exemplified below is a case of generating a 3D body image $B_1$ corresponding to the current frame image $F_1$ by referring to the flowchart of FIG. 4. Note here that the 3D body image $B_0$ corresponding to the frame image $F_0$ is assumed as being already generated.

In step S1, the frame image acquisition section 11 acquires the captured current frame image $F_1$, and supplies the image to the estimation section 12. The estimation section 12 acquires the 3D body image $B_0$ corresponding to the previous frame image $F_0$, which is fed back from the 3D body image generation section 14.

In step S2, the estimation section 12 forms a 3M×6N joint-constraint matrix $\Phi$ with the elements of coordinates of joints based on the body posture of the fed-back 3D body image $B_0$. The estimation section 12 also forms a 6N×(6n−3m) matrix V with the elements of base vectors in the null space of the joint-constraint matrix $\Phi$.

In step S3, the estimation section 12 selects any arbitrary three points not located on any same linear line for each of the parts configuring the fed-back 3D body image $B_0$, and computes the matrix C of 6N×6N.

In step S4, the estimation section 12 computes the motion vector $\Delta$ of a 3D body with no joint constraints based on the 3D body image $B_0$ and the current frame image $F_1$. That is, the estimation section 12 estimates the motion of each of the parts configuring a 3D body. For this estimation, any typical techniques that have previously existed can be used, e.g., Kalman filter, Particle filter, Interactive Closest Point, or others.

The results of the processes in steps S2 to S4, i.e., the matrix V, the matrix C, and the motion vector Δ, are supplied from the estimation section 12 to the motion vector determination section 13.

In step S5, the motion vector determination section 13 substitutes, into Equation 21, the matrix V, the matrix C, and the motion vector Δ provided by the estimation section 12, thereby computing the optimal motion vector Δ* with joint constraints for output to the 3D body image generation section 14.

In step S6, the 3D body image generation section 14 transforms the 3D body image $B_0$ generated for the current image $F_0$ using the motion vector Δ* with joint constraints provided by the motion vector determination section 13 so that the 3D body image $B_1$ is generated for the current frame image $F_1$. Herein, the resulting 3D body image $B_1$ is forwarded to the subsequent stage, and is fed back to the estimation section 12.

As such, the process of 3D body image generation is executed by the image processing device 10.

The above-described sequence of processes may be executed by hardware configured as shown in FIG. 3 or by software. If such processes are to be executed by software, a program configuring the software is installed from a program recording medium to a computer incorporated to any specific hardware, a general-purpose personal computer capable of various types of functions through installation of the programs varying in type, or the like.

Figure 5:
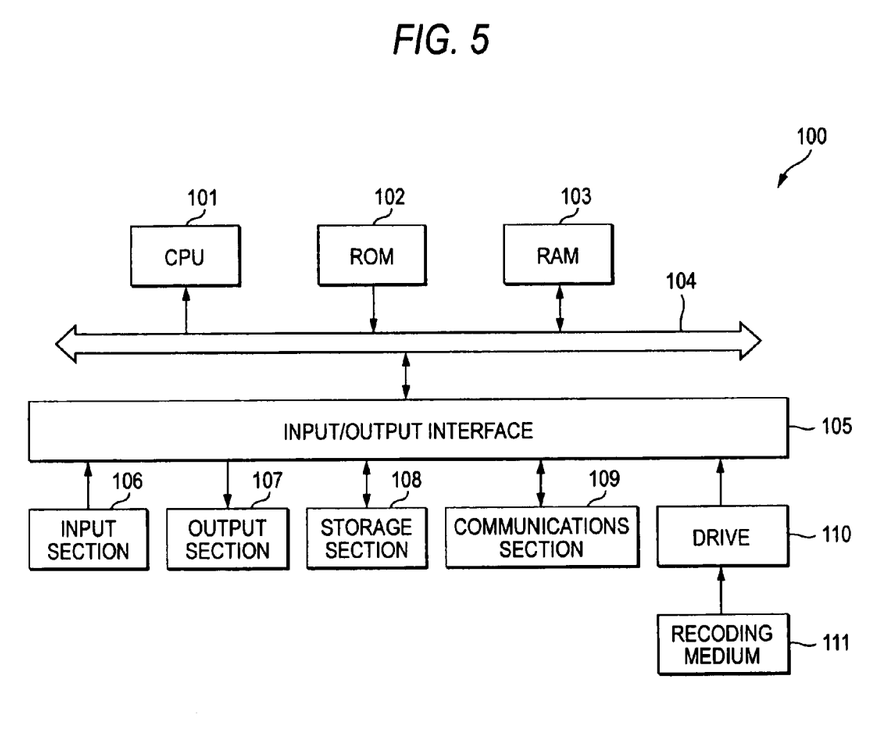
FIG. 5 is a block diagram showing an exemplary configuration of a computer.

FIG. 5 is a block diagram showing an exemplary configuration of a computer in which the sequence of processes is executed by a program.

In this computer 100, components, i.e., a CPU (Central Processing Unit) 101, a ROM (Read Only Memory) 102, and a RAM (Random Access Memory) 103, are connected together over a bus 104.

The bus 104 is connected with an input/output interface 105. The input/output interface 105 is connected with an input section 106, an output section 107, a storage section 108, a communications section 109, and a drive 110. The input section 106 is configured by a keyboard, a mouse, a microphone, and others, and the output section 107 is configured by a display, a speaker, and others. The storage section 108 is configured by a hard disk, a nonvolatile memory, and others, and the communications section 109 is configured by a network interface and others. The drive 110 drives a recording medium 111 such as magnetic disk, optical disk, magneto-optical disk, semiconductor memory, or others.

In the computer 100 configured as such, the CPU 101 loads, for execution, a program stored in the storage section 108 to the RAM 103 via the input/output interface 105 and the bus 104, for example, so that the above-described procedure processes are executed.

The program to be executed by the CPU 101 is made available through recording in the recording medium 111 being a package medium being a magnetic disk (including flexible disk), an optical disk (including CD-ROM (Compact Disc-Read Only Memory), DVD (Digital Versatile Disc)), and a magneto-optical disc, or a semiconductor memory, for example. The program is also made available via a transmission medium by cable or by radio such as a local area network, the Internet, and digital satellite broadcasting.

The program can be installed to the storage section 108 via the input/output interface 105 by attaching the recording medium 111 to the drive 110. Alternatively, the program may be installed to the storage section 108 after reception by the communications section 109 via a transmission medium by cable or by radio. Other than these, the program can be installed in advance in the ROM 102 or the storage section 108.

In this specification, in the program to be executed by a computer, processes may be executed in a time series manner in the described order or in a parallel manner, or at any required timing with a program call, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device that models, based on a plurality of frame images being results of time-sequential imaging of an object in motion, a motion of the object using a three-dimensional (3D) body configured by a plurality of parts, the device comprising:

acquisition means for acquiring the frame images being the imaging results;

estimation means for computing, based on a posture of the 3D body in any of the frame images selected for use as a reference, a first matrix of coordinates of a joint connecting the parts of the 3D body and a second matrix of coordinates of each of the parts of the 3D body, and generating a first motion vector with an estimation of a motion of each of the parts with no joint constraints based on the frame image subsequent to the reference frame image;

computing means for computing, using the first and second matrixes being computation results by the estimation means and the first motion vector, a second motion vector with an estimation of the motion of each of the parts with the joint constraints for a predetermined objective function to satisfy predetermined requirements; and determination means for determining the 3D body corresponding to the subsequent frame image by transforming the 3D body in the reference frame image in accordance with the second motion vector being a computation result, wherein the predetermined requirements for the predetermined objective function are to minimize a difference between a posture of the 3D body being a result of transformation by the first motion vector and a posture of the 3D body being a result of the transformation by the second motion vector, and wherein the predetermined objective function is $$(\Delta^* - \Delta)^t C (\Delta^* - \Delta)$$

the computing means computes the second motion vector for minimizing the predetermined objective function by $$\Delta^* = V(V^t C V)^{-1} V^t C \Delta$$

where

Δ* denotes the second motion vector,

V denotes the first matrix,

C denotes the second matrix, and,

Δ denotes the first motion vector.

2. The image processing device according to claim 1, wherein the estimation means computes the first matrix of the coordinates of the joint connecting the parts of the 3D body based on the posture of the reference 3D body in the reference frame image being the imaging result for use as a reference, and for each of the parts of the 3D body, computes the second matrix of the coordinates of a plurality of points located in the parts but not observed on any same linear line, and generates the first motion vector estimated for the motion of each of the parts with no joint constraints based on the frame image subsequent to the reference frame image.

3. The image processing device according to claim 1, wherein with the predetermined objective function, based on an assumption that the motion of the object is small between the reference frame image and the subsequent frame image, the motion of the object denoted by a spiral motion is made linear.

4. The image processing device according to claim 3, wherein the motion of the object between the reference frame image and the subsequent frame image is denoted using an absolute coordinates system.

5. The image processing device according to claim 1, wherein with the predetermined objective function, based on an assumption that the motion of the object is small between the reference frame image and the subsequent frame image, the motion of the object denoted by a rotational motion about each of three axes being orthogonal to one another is made linear.

6. The image processing device according to claim 5, wherein the motion of the object between the reference frame image and the subsequent frame image is denoted using a relative coordinates system.

7. An image processing method for use in an image processing device that models, based on a plurality of frame images being results of time-sequential imaging of an object in motion, a motion of the object using a three-dimensional (3D) body configured by a plurality of parts, the method comprising the steps of:
   computing, based on a posture of the 3D body in any of the frame images selected for use as a reference, a first matrix of coordinates of a joint connecting the parts of the 3D body;
   computing a second matrix of coordinates of each of the parts of the 3D body;
   generating a first motion vector with an estimation of a motion of each of the parts with no joint constraints based on the frame image subsequent to the reference frame image;
   computing, using the first and second matrixes being computation results and the first motion vector, a second motion vector with an estimation of the motion of each of the parts with the joint constraints for a predetermined objective function to satisfy predetermined requirements; and
   determining the 3D body corresponding to the subsequent frame image by transforming the 3D body in the reference frame image in accordance with the second motion vector being a computation result,
   wherein the predetermined requirements for the predetermined objective function are to minimize a difference between a posture of the 3D body being a result of transformation by the first motion vector and a posture of the 3D body being a result of transformation by the second motion vector, and
   wherein the predetermined objective function is $$(\Delta^*-\Delta)^t C (\Delta^*-\Delta)$$

the computing means computes the second motion vector for minimizing the predetermined objective function by $$\Delta^* = V(V^t C V)^{-1} V^t C \Delta$$

where
$\Delta^*$ denotes the second motion vector,
V denotes the first matrix,
C denotes the second matrix, and,
$\Delta$ denotes the first motion vector.

8. A non-transitory computer-readable storage device having recorded thereon a program for use to control over a computer that models, based on a plurality of frame images being results of time-sequential imaging of an object in motion, a motion of the object using a three-dimensional (3D) body configured by a plurality of parts, the program when executed on the computer causes the computer to execute the steps of:
   computing, based on a posture of the 3D body in any of the frame images selected for use as a reference, a first matrix of coordinates of a joint connecting the parts of the 3D body;
   computing a second matrix of coordinates of each of the parts of the 3D body;
   generating a first motion vector with an estimation of a motion of each of the parts with no joint constraints based on the frame image subsequent to the reference frame image;
   computing, using the first and second matrixes being computation results and the first motion vector, a second motion vector with an estimation of the motion of each of the parts with the joint constraints for a predetermined objective function to satisfy predetermined requirements; and
   determining the 3D body corresponding to the subsequent frame image by transforming the 3D body in the reference frame image in accordance with the second motion vector being a computation result,
   wherein the predetermined requirements for the predetermined objective function are to minimize a difference between a posture of the 3D body being a result of transformation by the first motion vector and a posture of the 3D body being a result of transformation by the second motion vector, and
   wherein the predetermined objective function is $$(\Delta^*-\Delta)^t C (\Delta^*-\Delta)$$

the computing means computes the second motion vector for minimizing the predetermined objective function by $$\Delta^* = V(V^t C V)^{-1} V^t C \Delta$$

where
$\Delta^*$ denotes the second motion vector,
V denotes the first matrix,
C denotes the second matrix, and,
$\Delta$ denotes the first motion vector.

9. An image processing device that models, based on a plurality of frame images being results of time-sequential imaging of an object in motion, a motion of the object using a three-dimensional (3D) body configured by a plurality of parts, the device comprising:
   an acquisition unit configured to acquire the frame images being the imaging results;
   an estimation unit configured to compute, based on a posture of the 3D body in any of the frame images selected for use as a reference, a first matrix of coordinates of a joint connecting the parts of the 3D body and a second matrix of coordinates of each of the parts of the 3D body, and generate a first motion vector with an estimation of a motion of each of the parts with no joint constraints based on the frame image subsequent to the reference frame image;
   a computation unit configured to compute, using the first and second matrixes being computation results by the estimation unit and the first motion vector, a second motion vector with an estimation of the motion of each of the parts with the joint constraints for a predetermined objective function to satisfy predetermined requirements; and a determination unit configured to determine the 3D body corresponding to the subsequent frame image by transforming the 3D body in the reference frame image in accordance with the second motion vector being a computation result, wherein the predetermined requirements for the predetermined objective function are to minimize a difference between a posture of the 3D body being a result of transformation by the first motion vector and a posture of the 3D body being a result of the transformation by the second motion vector, and wherein the predetermined objective function is $$(\Delta^*-\Delta)^t C(\Delta^*-\Delta)$$

the computing means computes the second motion vector for minimizing the predetermined objective function by $$\Delta^* = V(V^t CV)^{-1} V^t C\Delta$$

where
$\Delta^*$ denotes the second motion vector,
V denotes the first matrix,
C denotes the second matrix, and,
$\Delta$ denotes the first motion vector.

* * * * *